J. L. STROUB.
Clam-Bakers.
No. 199,595. Patented Jan. 22, 1878.
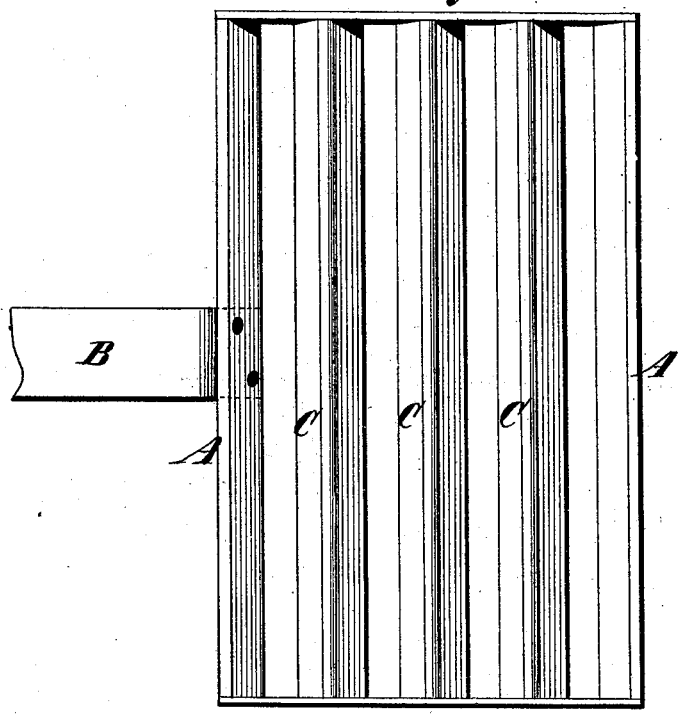
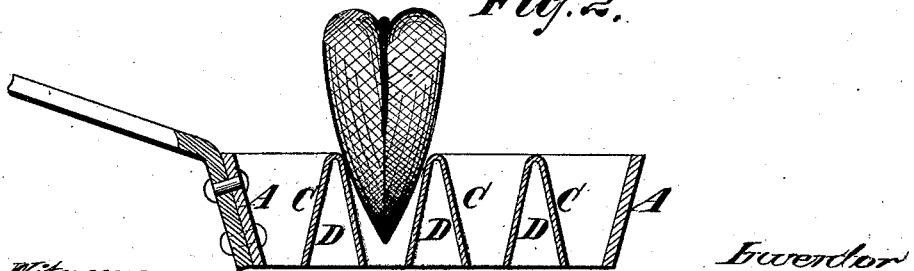
Witnesses:
Fred K Haynes
E. B. Sperry
Inventor
John L. Stroub
by his Attorneys
Brown & Allen

UNITED STATES PATENT OFFICE.

JOHN L. STROUB, OF NEW YORK, N. Y.

IMPROVEMENT IN CLAM-BAKERS.

Specification forming part of Letters Patent No. 199,595, dated January 22, 1878; application filed July 10, 1877.

*To all whom it may concern:*

Be it known that I, JOHN L. STROUB, of the city and State of New York, have invented an Improvement in Clam-Bakers; and I do hereby declare that the following is a full, clear, and exact description of the same, reference being had to the accompanying drawing, forming part of this specification.

My invention has for its object the supply of a much-needed implement for baking clams in their shells, by the use of which clams may be baked much more uniformly than has hitherto been possible, retaining in the shells the liquor which has hitherto escaped while the baking proceeds, and thereby preventing the scorching and burning which often take place, while at the same time the cooked clams are more succulent and palatable than when cooked in the ordinary manner. The operation of baking clams is so much facilitated by my invention that I have been able to materially reduce the price at which I sell baked clams to customers, thus cheapening what is in seaboard localities a popular and important article of diet. The invention also saves the operator from prolonged exposure to heat, which has hitherto been an accompaniment of the process of baking clams.

The invention consists in the formation of the inverted V-shaped bars with inverted V-shaped cavities on their under sides, for the purpose of more quickly and uniformly distributing heat to the shells of the clams to be baked.

Figure 1 is a top view of my improved clam-baker. Fig. 2 is a vertical cross-section, showing the inverted V-shaped bars with inverted V-shaped cavities in their under sides, and also illustrating the manner of placing clams in the implement for baking.

A is a rectangular frame, to which is attached a handle, B, by riveting or otherwise. The sides of the frame A are downwardly and inwardly inclined, so that the bottom is narrower than the top. To the ends of the said frame, at or about at equal intervals from the sides of said frame and from each other, are attached inverted V-shaped bars C. Said bars are constructed with inverted V-shaped cavities D on their under sides, as shown in Fig. 2, which allows the heat to be more quickly distributed to the clams when placed over the fire, and also permits the implement to be cheaply made of sheet metal.

In use the clams are placed, as shown in Fig. 2, with the edge or mouth of the shell downward, and wedged in between the bars and the frame and adjacent bars, in such manner that they cannot open till removed from the implement, which is made of a size to hold the proper number of clams for one or more persons. The whole being placed over a suitable fire, the clams are left without further attention for the proper time to accomplish the baking, at the end of which time the clams are all at once turned out on a suitable dish by inverting the implement.

The bars C may be slotted or perforated to allow freer access of heat to the clams.

I claim—

The combination, with the frame A, of the inverted V-shaped bars C, formed with inverted V-shaped cavities on their under sides, and attached at their ends to the sides of the frame, substantially as and for the purpose described.

JOHN L. STROUB.

Witnesses:
 BENJAMIN W. HOFFMAN,
 FRED. HAYNES.